United States Patent [19]
Pai

[11] Patent Number: 5,318,819
[45] Date of Patent: Jun. 7, 1994

[54] PIPE JOINING CONSTRUCTION OF A BICYCLE FRAME

[76] Inventor: Ching-Dong Pai, No. 3, Yu San Rd., Yu Shih Industrial District, Ta Chia Chen, Taichung Hsien, Taiwan

[21] Appl. No.: 15,656

[22] Filed: Feb. 9, 1993

[51] Int. Cl.⁵ .............................................. B32B 5/18
[52] U.S. Cl. ................................. 428/71; 428/36.5; 280/288.3; 280/281.1; 403/220; 403/225; 403/226; 403/291
[58] Field of Search ................ 403/28, 29, 30, 40, 403/225, 226, 220, 291; 280/288.3, 281.1; 428/36.5, 71

[56] References Cited

U.S. PATENT DOCUMENTS 4,598,922 7/1986 Kleinebenne ..................... 280/279
4,856,800 8/1989 Hashimoto et al. .
5,052,848 10/1991 Nakamura ......................... 403/268

Primary Examiner—Ellis P. Robinson
Assistant Examiner—Michael A. Williamson
Attorney, Agent, or Firm—Merchant, Gould, Smith, Edell, Welter & Schmidt

[57] ABSTRACT

A pipe joining construction includes a tube, two or more extensions extended from the tube, a tube member coupled to each of the extensions so as to form a joint portion, an insert disposed in each of the tube members and the extensions and having an envelope and a foamable material disposed in the envelope, a covering having an outer layer wrapped around the joint portion and a foamable material disposed between the outer layer and the joint portion. When foamed, the foamable materials apply forces against the tube members and the extensions so as to solidly couple them together.

2 Claims, 3 Drawing Sheets

PIPE JOINING CONSTRUCTION OF A BICYCLE FRAME

BACKGROUND OF THE INVENTION

1. Field of the Invention

The present invention relates to a pipe joining construction, and more particularly to a pipe joining construction of a bicycle frame.

2. Description of the Prior Art

A typical pipe joining construction of a bicycle frame is disclosed in U.S. Pat. No. 4,856,800 to Hashimoto et al., filed Apr. 26, 1988; in this patent, the covering body is made from SMC which includes plastic and chopped fibers. Obviously, the SMC is simply adhered to the lug and the pipe and applies no force against the lug and the pipe. In addition, the fibers should be chopped such that the fibers are not continuous and such that the strength of the fibers is thus greatly decreased.

The present invention has arisen to mitigate and/or obviate the afore-described disadvantages of the conventional pipe joining constructions.

SUMMARY OF THE INVENTION

The primary objective of the present invention is to provide a pipe joining constructive of a bicycle frame in which the the insert and the covering body apply forces against the bicycle frame such that the tubes of the bicycle frame can be solidly coupled together.

In accordance with one aspect of the invention, there is provided a pipe joining construction comprising a tube body including at least two extensions extended therefrom, a tube member engaged to and coupled to each of the extensions of the tube body by such as force-fitted engagement so as to form a joint portion, an insert disposed in each of the tube member and extended inwards of the respective extensions, each of the insert including an envelope having a foamable material disposed therein, a covering body including an outer layer wrapping around the joint portion and a foamable material disposed between the outer layer and the joint portion, the foamable materials applying forces against the tube members and the extensions so as to solidly couple the tube members and the extensions together.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
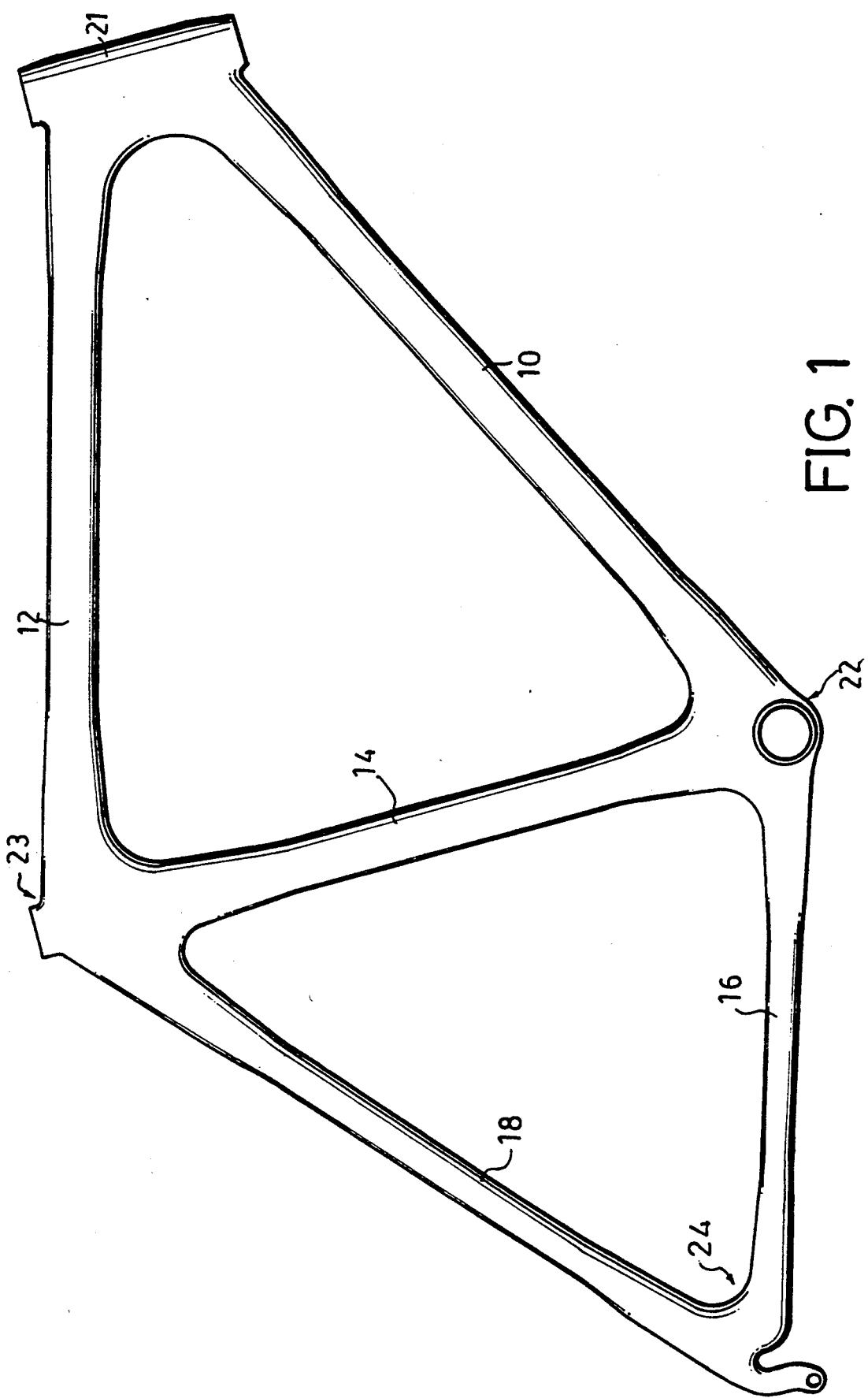
FIG. 1 is a plane view of a bicycle frame.

Referring to the drawings, and initially to FIG. 1, a typical bicycle frame is shown and comprises a down tube 10 and a top tube 12 coupled at one end by a head tube 21, a seat tube 14 coupled between the down tube 10 and the top tube 12 at a hub 22 and a coupling portion 23 respectively, a chain stay 16 and a seat stay 18 coupled at one end by a connecting portion 24, the chain stay 16 also coupled to the hub 22 and the seat stay 18 also coupled to the coupling portion 23. The pipe joining construction of the bicycle frame in accordance with the present invention is provided to couple the down tube 10, the top tube 12, the seat tube 14, the chain stay 16 and the seat stay 18 together respectively.

Figure 2:
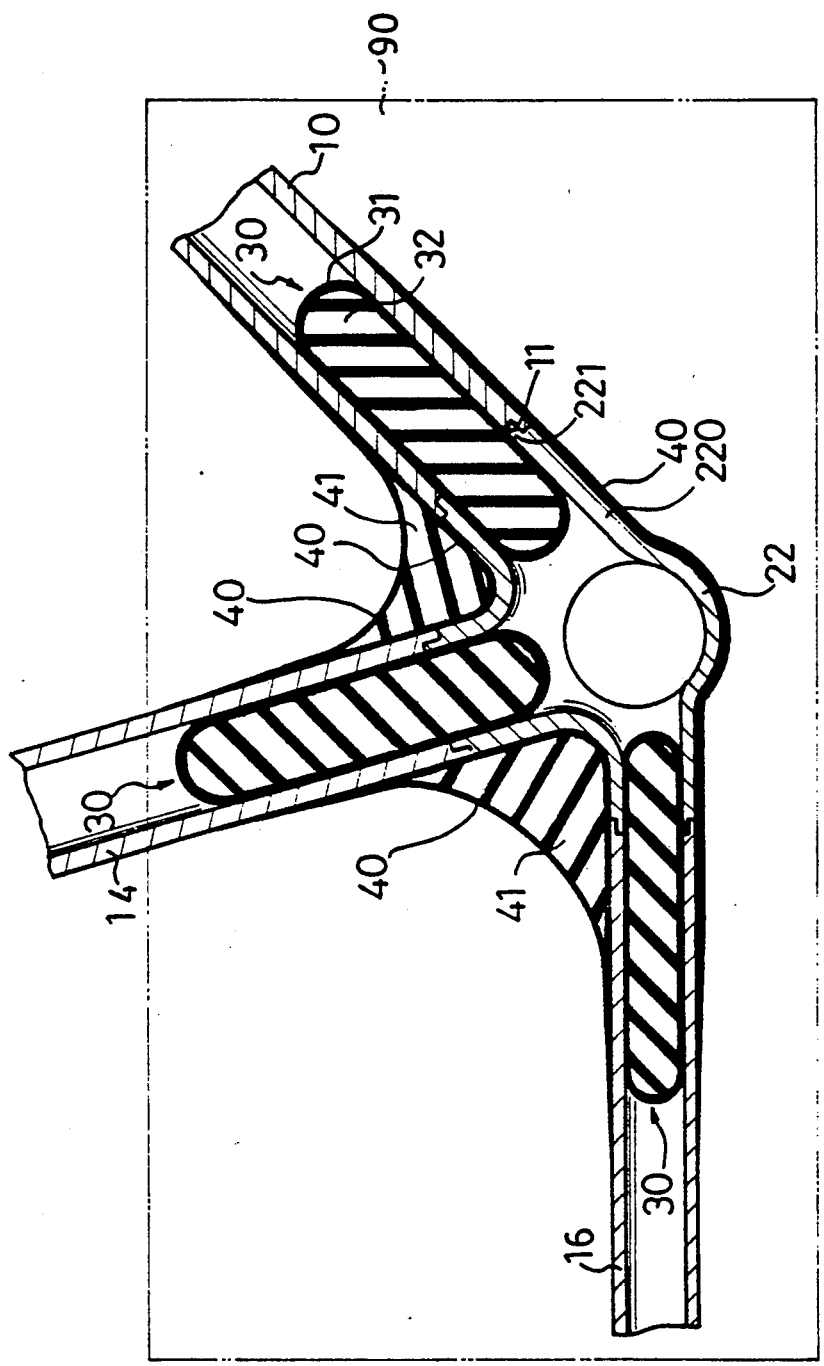
FIG. 2 is a cross sectional view of a pipe joining construction of the hub portion of the bicycle frame in accordance with the present invention.

Referring next to FIG. 2, illustrated is the hub 22 of the bicycle frame, the pipe joining construction of the hub 22 comprises a tube body 22 including three extensions 220 extended outward therefrom for coupling to the down tube 10, the seat tube 14 and the chain stay 16 respectively, each of the extensions 220 includes an annular flange 221 extended therefrom, and an annular shoulder 11 is formed in each of the down tube 10, the seat tube 14 and the chain stay 16 for engagement with the annular flanges 221 of the extensions 220 respectively, by such as force-fitted engagement or the like.

An insert 30 is disposed in each of the down tube 10, the seat tube 14 and the chain stay 16 and extended inwards of the respective extensions 220 of the tube body 22, each of the inserts 30 includes an envelope 31 formed by a plurality of plies of resin-impregnated unidirectional graphite fiber sheets or other composite materials, such as glass fibers, boron fibers, etc., each of the inserts 30 further includes foamable materials 32 disposed in the envelope 31, and made of such as PU, E.V.A. . . . etc. A covering body includes an outer layer 40 covering the outer peripheral portion of the joint portion of the tube body 22 and the down tube 10 and the seat tube 14, and a foamable material 41 disposed in the joint portion and covered or wrapped by the outer layer 40, the joint portion is formed or shaped by hot-pressing processes in a mold 90. It is important that the foamable materials are foamed and expanded during hot-pressing processes, such that the foamable materials apply a force against the tubes of the joint portion, and such that the tubes can be solidly coupled together.

Figure 3:
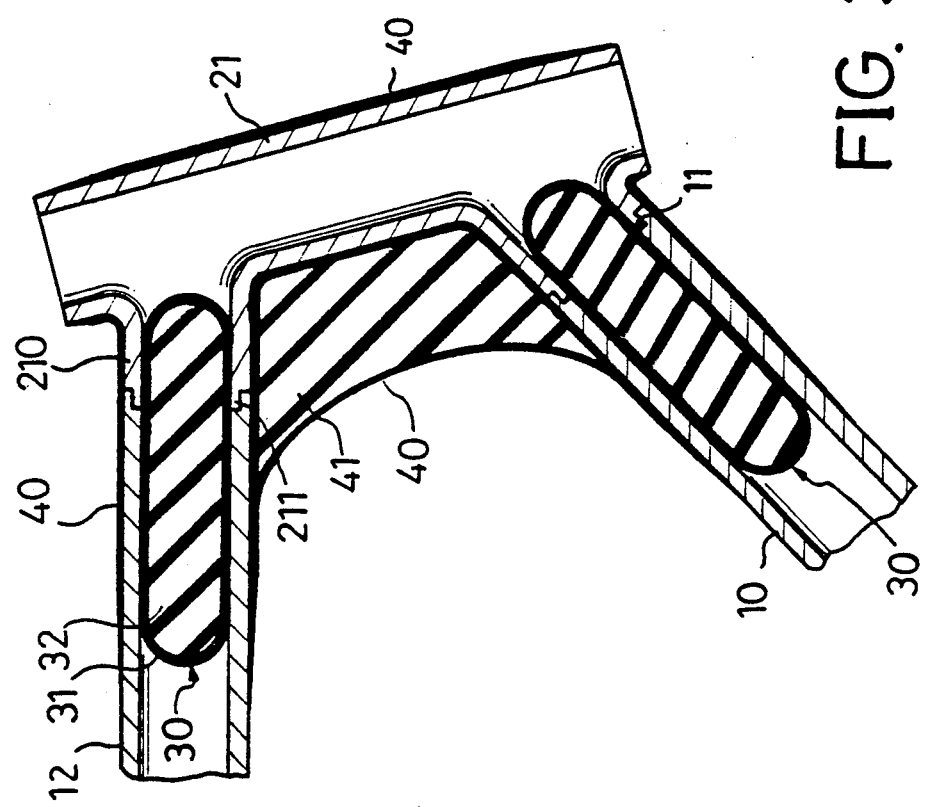
FIG. 3 is a cross sectional view illustrating pipe joining construction of the head tube of the bicycle frame.

Referring next to FIG. 3, the head tube portion 21 of the bicycle frame also includes a tube body 21 having two extensions 210 extended outward therefrom, each of the extensions 210 having an annular flange 211 extended outward therefrom for engagement with the annular shoulder 11 of the down tube 10 and the top tube 12. Similarly, an insert 30 is disposed in each of the down tube 10 and the top tube 12 and extended inwards of the respective extensions 210 and includes an envelope 31 having a foamable material 32 disposed therein, and a covering body includes an outer layer 40 wrapped around the outer peripheral portion of the head tube portion 21 and a foamable material 41 disposed therein. The foamable materials 32 and 41 are also foamed during hot-pressing processes such that the foamable materials apply forces against the joint portion and such that the tubes of the joint portion can be solidly coupled together.

It is to be noted that the outer layer 40 is formed by continuous fiber materials such that the strength of the fiber materials is maintained and will not be decreased.

It is further to be noted that the pipe joining construction in accordance with the present invention does not need welding processes or adhering processes, such that the pipe joining construction is good for coupling or securing any kind of tubes or pipes together, i.e., tubes or pipes of various kinds of materials, such as aluminum alloy, composite materials, steel, iron, titanic alloy, etc.

It is further to be noted that the foamable materials form an excellent shock absorption materials which absorb the shocks or vibrations transmitted to the bicycle frame, such that the riders may feel more comfortable.

Accordingly, the pipe joining construction in accordance with the present invention includes an insert and a covering body which apply forces against the bicycle frame such that the tubes of the bicycle frame can be solidly coupled together.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pipe joining construction of a bicycle frame comprising a tube body including at least two extensions extended therefrom, a tube member engaged to each of said extensions of said tube body so as to form a joint portion, an insert disposed in each of said tube members and extended inwards of the respective extensions, each of said insert including an envelope made of composite materials that are resin impregnated unidirectional fibers and a foamable material disposed in said envelope, a covering body including an outer layer of composite materials wrapped around said joint portion and a foamable material disposed between said outer layer and said joint portion, said foamable materials being foamed when heated for applying forces against said tube members and said extensions so as to solidly couple said tube members and said extensions together.

2. A pipe joining construction according to claim 1, wherein each of said extensions includes an annular flange extended therefrom, each of said tube members includes an annular shoulder formed therein for force-fitted engagement with said annular flanges of said extensions respectively.

* * * * *